(12) United States Patent
L'Eplattenier

(10) Patent No.: US 8,489,372 B2
(45) Date of Patent: Jul. 16, 2013

(54) FEM-BEM COUPLING METHODS AND SYSTEMS FOR SLIDING CONTACT INTERFACE

(75) Inventor: Pierre L'Eplattenier, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 393 days.

(21) Appl. No.: 12/910,632

(22) Filed: Oct. 22, 2010

(65) Prior Publication Data
US 2011/0218781 A1   Sep. 8, 2011

Related U.S. Application Data

(60) Provisional application No. 61/311,522, filed on Mar. 8, 2010.

(51) Int. Cl.
*G06F 7/60* (2006.01)
*G06F 17/00* (2006.01)
*G06G 7/48* (2006.01)

(52) U.S. Cl.
USPC ..................... 703/7; 703/2; 703/6

(58) Field of Classification Search
USPC ..................... 703/7, 2, 6
See application file for complete search history.

(56) References Cited

PUBLICATIONS

Ulacia, Ibai et al., "Influence of the Coupling Strategy in the Numerical Simulation of Electromagnetic Sheet Metal Forming", Jul. 24, 2008, 10h International LS-DYNA Users Conference.*

Jarnieux, M. et al., "FEM Modeling of the Magnetic, Thermal, Electrical and Mechanical Transient Phenomena in Linear Induction Launchers", Sep. 1994, IEEE Transactions on Magnetics, vol. 30, No. 5.*
Stolarski, T. et al., "Engineering Analysis with ANSYS Software", 2006, Elsevier Butterworth-Heinemann, pp. (xv, 67-70).*
Chung, Bummo, "Finite-Element Analysis of Physical Phenomena of a Lab-Scale Electromagnetic Launcher", Aug. 2007, Master of Science in Mechanical Engineering, Georgia Institute of Technology, pp. (75, 76, 119).*
Finite-Element Analysis of Physical Phenomena of a Lab-Scale Electromagnetic Launcher, Bummo Chung, Master of Science Thesis, Dept. of Mechanical Engineering, Georgia Institute of Technology, Aug. 2007.
International Railgun Modeling Effort, K. T. Hsieh and B. K. Kim, IEEE Transactions on Magnetics, vol. 33, No. 1, Jan. 1997.

(Continued)

*Primary Examiner* — David Silver
*Assistant Examiner* — Cedric D Johnson
(74) *Attorney, Agent, or Firm* — Roger H. Chu

(57) ABSTRACT

Systems and methods of numerically simulating physical phenomena of firing an electromagnetic rail-gun using a coupled FEM-BEM procedure are disclosed. Electromagnetic rail-gun includes a pair of parallel rails and a projectile located therebetween. Rails and projectile are represented by a FEM model, while the ambient air surrounding the rail-gun is represented by a BEM mesh for simulating the electromagnetic fields. The BEM mesh is generated from the FEM model as a surface encasing the projectile and rails. A sliding contact interface between each of the rails and the projectile causes the BEM faces in contact to be removed and thus resulting into a hole/gap in the BEM mesh. The hole/gap is patched up with new triangular BEM faces without adding new nodes in accordance with a predefined set of rules, such that the resulting BEM mesh is suitable for carrying out the coupled FEM-BEM procedure.

10 Claims, 12 Drawing Sheets

PUBLICATIONS

A Sliding Mesh-Mortar Method for a Two Dimensional Eddy Currents Model of Electric Engines, Annalisa Buffa, Yvon Maday, and Francesca Rapetti, Mathematical Modelling and Numerical Analysis, vol. 35, No. 2, 2001, pp. 191-228.

Modelling of the Armature-Rail Interface in an Electromagnetic Launcher with Lubricant Injection, Lei Wang, Ph. D. Dissertation, Dept. of Mechanical Engineering, Georgia Institute of Technology, Dec. 2008.

* cited by examiner

FEM-BEM COUPLING METHODS AND SYSTEMS FOR SLIDING CONTACT INTERFACE

This application claims priority from a U.S. provisional patent application Ser. No. 61/311,522 for the same title, filed on Mar. 8, 2010, the entire content of which is incorporate herein by reference.

FIELD OF THE INVENTION

The present invention generally relates to computer aided mechanical engineering analysis, more particularly to methods and systems for simulating physical phenomena of firing an electromagnetic rail-gun using a coupling procedure of finite element method (FEM) and boundary element method (BEM). FEM is used for solving the mechanical and thermal fields while a coupled FEM-BEM is for the electromagnetic fields.

BACKGROUND OF THE INVENTION

Computer aided engineering (CAE) has been used for supporting engineers in tasks such as analysis, simulation, design, manufacturing, etc. In a conventional mechanical engineering design procedure, CAE analysis (e.g., finite element method (FEM), boundary element method (BEM), finite difference analysis, meshless analysis, etc.) has been employed to evaluate structural responses (e.g., stresses, displacements, etc.).

With advent of the digital computer, many engineering simulations are more sophisticated, it requires coupling of more than one aforementioned method to accomplish. For example, FEM-BEM coupling can be used for simulating physical phenomena of electromagnetism, fluid-structure interaction, and others.

Coupling of these two numerical methods can sometimes be problematic especially involving a sliding boundary between two objects. For example, simulating operations of firing an electromagnetic rail-gun requires coupling of FEM-BEM with a sliding contact interface. Rail-gun comprises a pair of parallel rails and a projectile situated therebetween. When a large electrical current passes through the projectile between the pair of rails, a strong magnetic field force is generated to accelerate the projectile. In a numerical simulation using FEM-BEM, rails and projectile are represented with a FEM model (e.g., solid elements), while the electrical magnetic field in the surrounding air is represented by a BEM mesh. The BEM mesh is generated from the FEM model, as the outside surface of the FEM model.

Dealing with a sliding contact in BEM is complicated because the integrals defining the BEM matrices entries become singular for neighboring BEM faces, thereby it is necessary to avoid any hole in the BEM surface mesh. Many of the prior art approaches have been imposing constraints to "hanging" nodes along the contact boundary. However, the simulation results of these prior art approaches are generally poor. It is noted that "hanging" nodes are caused by relative movements between the projectile and the rails.

Therefore, it would be desirable to have methods and systems for handling sliding contact interface in a coupling procedure of finite element method (FEM) and boundary element method (BEM), such that simulations of fast moving object in an electromagnetic field can be conducted.

SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems and methods of numerically simulating physical phenomena of firing an electromagnetic rail-gun using a coupled FEM-BEM procedure in a time-marching simulation are disclosed. According to one aspect of the present invention, electromagnetic rail-gun includes a pair of parallel rails and a projectile located therebetween. Rails and projectile are numerically represented by a FEM model, while the ambient air surrounding the rail-gun is represented by a BEM mesh for simulating the electromagnetic fields. The BEM mesh is generated from the FEM model as a surface encasing the projectile and the rails (i.e. the conductors). A sliding contact interface between the rails and the projectile causes the BEM faces in contact to be removed and thus resulting into a hole or gap in the BEM mesh at each contact interface. A sliding contact interface is the contact area between the projectile and each of the rails. Contact area are detected and determined at each solution cycle of the time-marching simulation.

In order to ensure a good accuracy in solving the electromagnetic fields using BEM, holes in the BEM mesh must be patched up to be a continuous surface. A layer of triangular BEM faces or facets are added for patching up the hole/gap without creating extra BEM nodes.

According to another aspect, the hole or gap is filled up or patched up at each solution cycle due to the projectile's position relative to the rails in the time-marching simulation. When the hole or gap is too small for a layer of BEM faces or facets, the BEM faces surrounding the hole are adjusted in a set of particular predefined rules to ensure a proper sized BEM face can be fitted in (e.g., reduction or adjustment to all bordering BEM faces with a certain ratio (20% for example)). To ensure a continuous BEM mesh, triangular faces or facets are used when necessary. Further, newly added BEM faces are created in accordance with a set of predefined rules. For example, BEM nodes are offset by a preset amount to ensure BEM faces meeting the aspect ratio requirement in the coupled FEM-BEM procedure.

After the new layer of BEM faces is added, the time-marching simulation is conducted for the next solution cycle using the FEM-BEM coupling technique. In particular, FEM is used for solving the Maxwell equations for the solid conductors, while BEM is for the electromagnetic fields for the surrounding air or insulators. For example, electric field, magnetic field, induced currents, electromagnetic (Lorentz) forces and ohmic heating are simulated. With added new BEM faces, the BEM mesh becomes a continuous surface, standard BEM procedures can then be applied.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-7. However, those skilled in the art will readily appreciate that the detailed description given herein with respect to these figures is for explanatory purposes as the invention extends beyond these limited embodiments.

Figure 1:
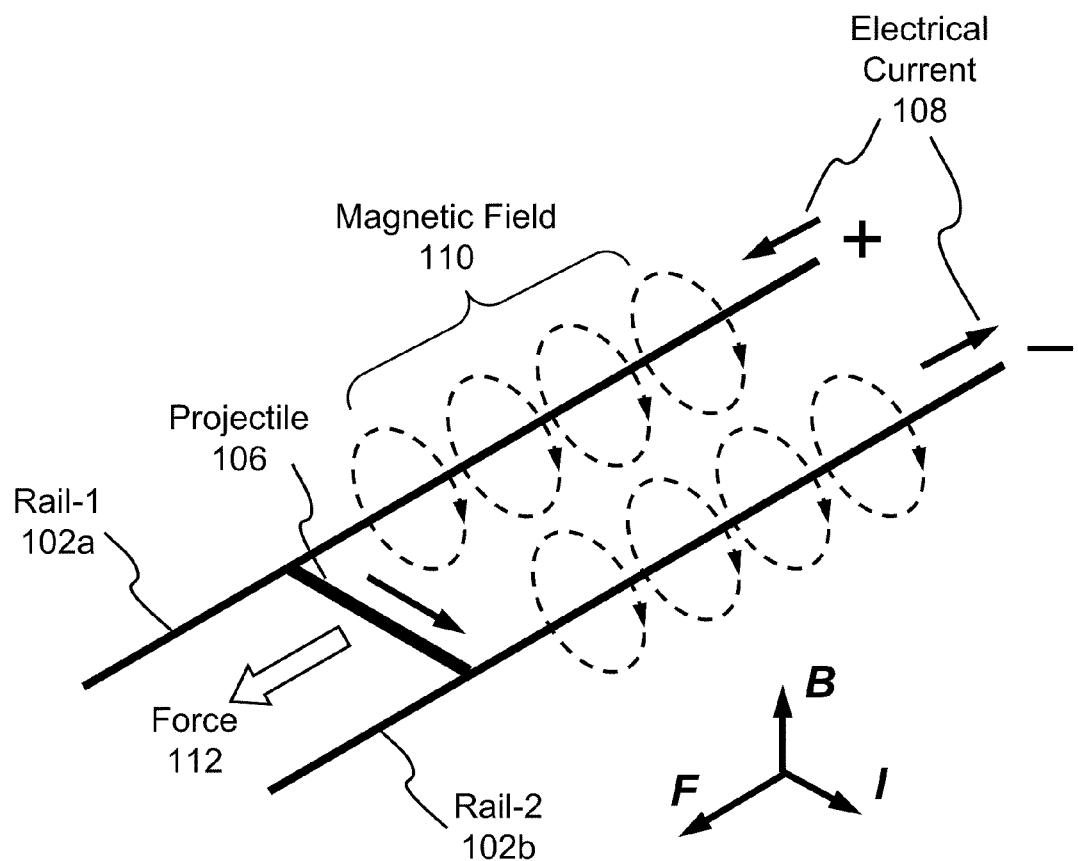
FIG. 1 is a schematic diagram showing salient components and physical phenomena of firing an exemplary electromagnetic rail-gun.

Referring first to FIG. 1, it is shown a schematic diagram of an exemplary electromagnetic rail-gun 100. Rail-gun 100 comprises a pair of parallel rails (i.e., Rail-1 102a and Rail-2 102b) and a projectile 106 located therebetween. Rails 102a-b and projectile 106 are made of conductive material such that an electrical current 108 (from positive "+" to negative "−") can flow through from one rail (e.g., Rail-1 102a) to another (e.g, Ral-2 102b) via the projectile 106. A magnetic field 110 is created and results into a force 112 (electromagnetic force) that propels the projectile 106 forward.

Figure 2A:
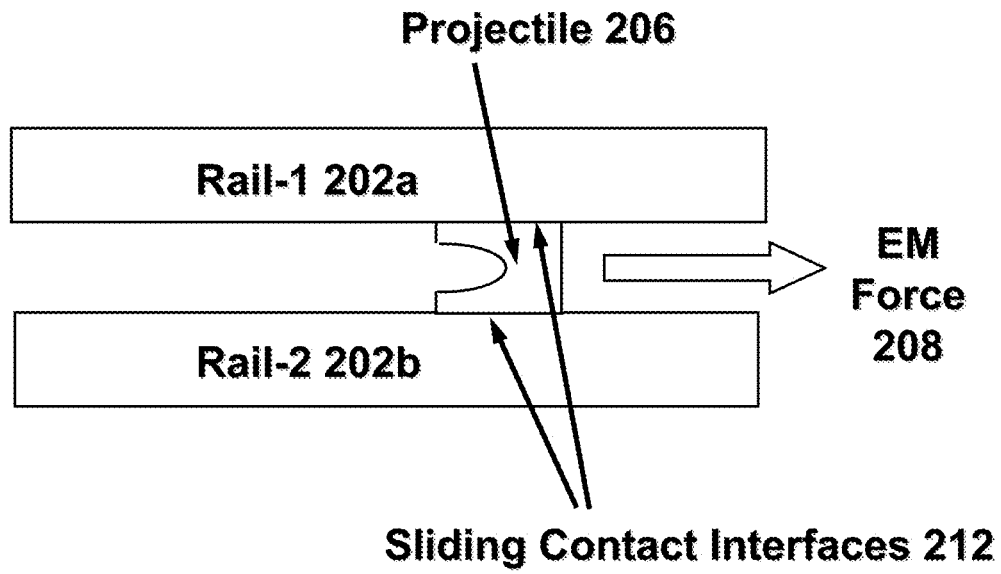
FIG. 2A is a schematic diagram showing an exemplary sliding contact interface used in numerically simulation of an electromagnetic rail-gun in accordance with one embodiment of the present invention.
Figure 2B:
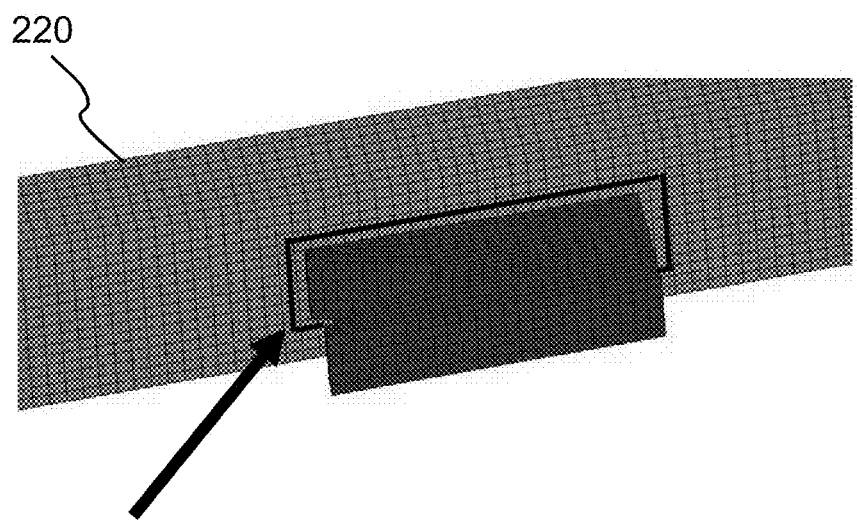
FIG. 2B is a perspective view of a partial finite element method mesh showing a contact interface between a projectile and a rail in accordance with one embodiment of the present invention.

FIG. 2A shows a schematic of an exemplary numerical simulation model (e.g., FEM-BEM model) having a pair of rails (Rail-1 202a and Rail-2 202b) and a projectile 206. Electromagnetic (EM) force 208 is a result of the magnetic field. Contact interfaces 212 are between the rails 202a-b and the projectile 206. FIG. 2B is a perspective view showing an exemplary partial finite element model 220 of an electromagnetic rail-gun having a sliding contact interface 212 with a projectile and one side of the pair of rails in accordance with one embodiment of the present invention. It is noted that only one contact interface is shown. In general, there are two contact interfaces, one at each side of the projectile 206. To form a continuous BEM mesh, the facets or faces at contact interfaces are removed, for example, outside faces of the FEM model for the rails and the projectile in contact with each other.

Figure 3C:
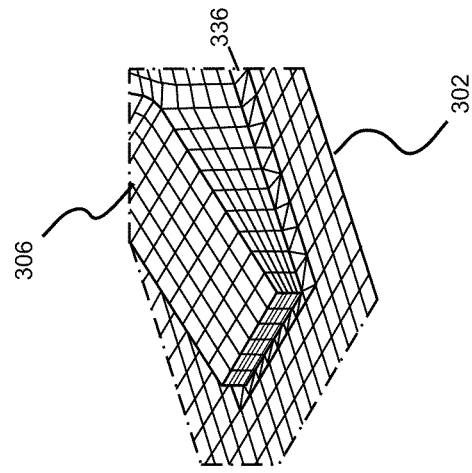
FIGS. 3A-3C are perspective views showing an exemplary partial BEM mesh near a sliding contact interface in accordance one embodiment of the present invention.
Figure 3B:
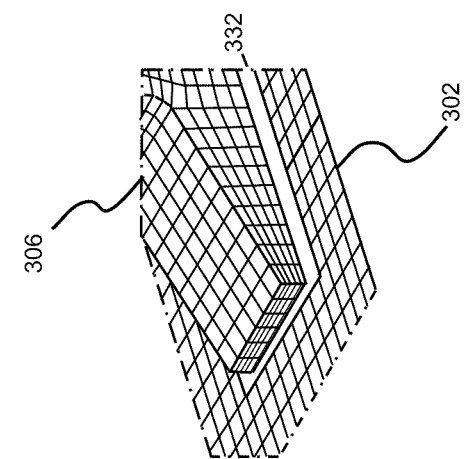
Figure 3A:
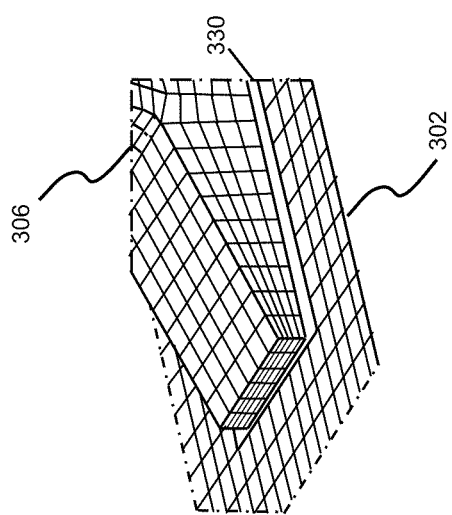

FIGS. 3A-3C are perspective views showing an exemplary partial BEM mesh near a sliding contact interface in accordance with one embodiment of the present invention. In FIG. 3A, a gap/hole 330 is shown between a projectile 306 and a rail 302. The gap/hole 330 is a result of removing BEM faces that are in contact with each other. In certain circumstance, the gap/hole 330 may be too small to create a layer of suitable BEM faces meeting numerical requirements (e.g., aspect ratio too large) in a coupled FEM-BEM procedure. In order to overcome such deficiency, the hole/gap 330 is enlarged by adjusting BEM nodes around the gap/hole 330. The resulting enlarged gap/hole 332 is shown in FIG. 3B. Finally new triangular BEM faces 336 are added to patch up the gap/hole. These newly added BEM facets would then meet the requirement for the coupled FEM/BEM procedure and other requirements (e.g., without adding BEM nodes).

The procedure of removing BEM faces in contact area and patching up with a new layer of triangular BEM faces suitable for the coupled FEM-BEM calculations is performed throughout numerical simulation of firing electromagnetic rail-gun.

To further demonstrate numerical model of the contact interface, FIGS. 4A-4D show a sequence of schematic diagrams. Shown in FIG. 4A, mesh 400 is a partial BEM mesh (outside surface of a FEM model) at around a contact interface (e.g., a partial BEM mesh on one side of the rail). BEM mesh 400 contains faces 402, nodes 404 and edges 406.

Figure 4A:
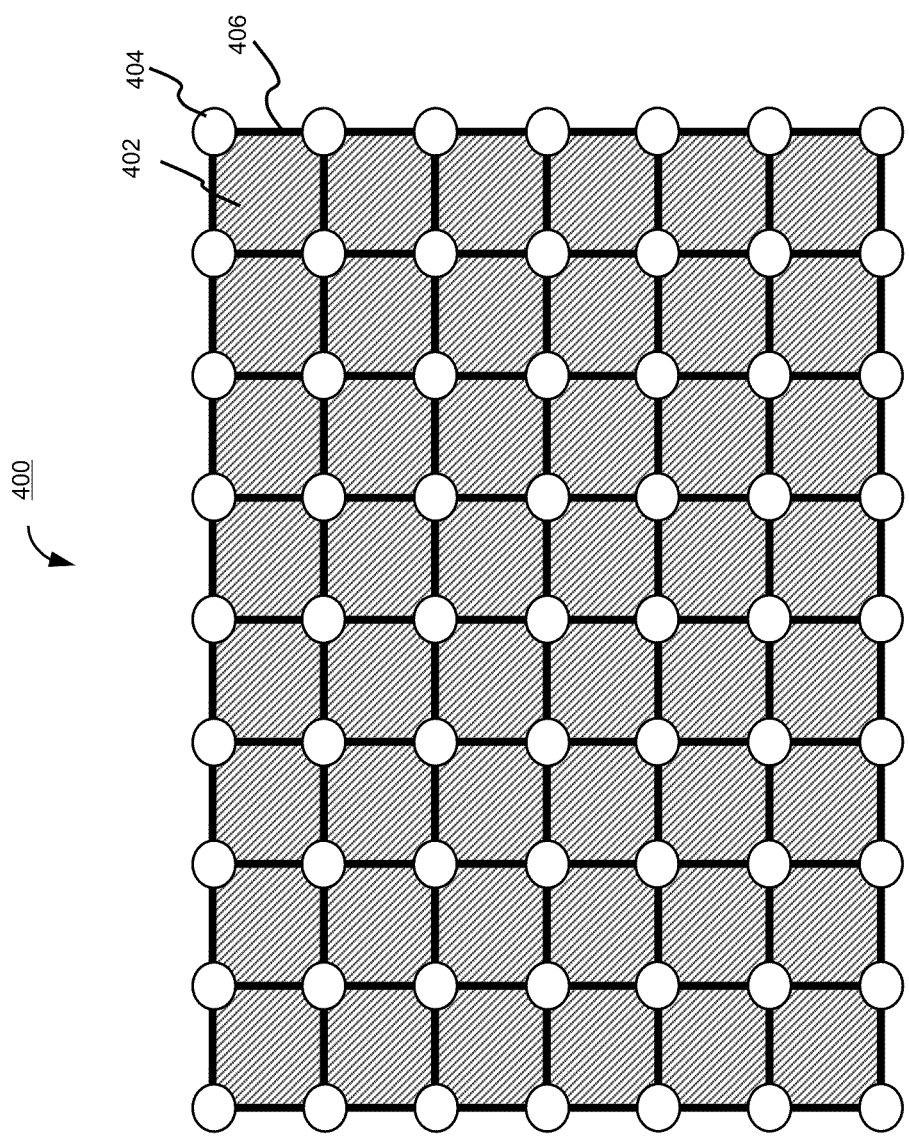
FIGS. 4A-4D are a series of diagrams showing an exemplary contact interface and the removal of the BEM faces in contact interface area in accordance with one embodiment of the present invention.
Figure 4B:
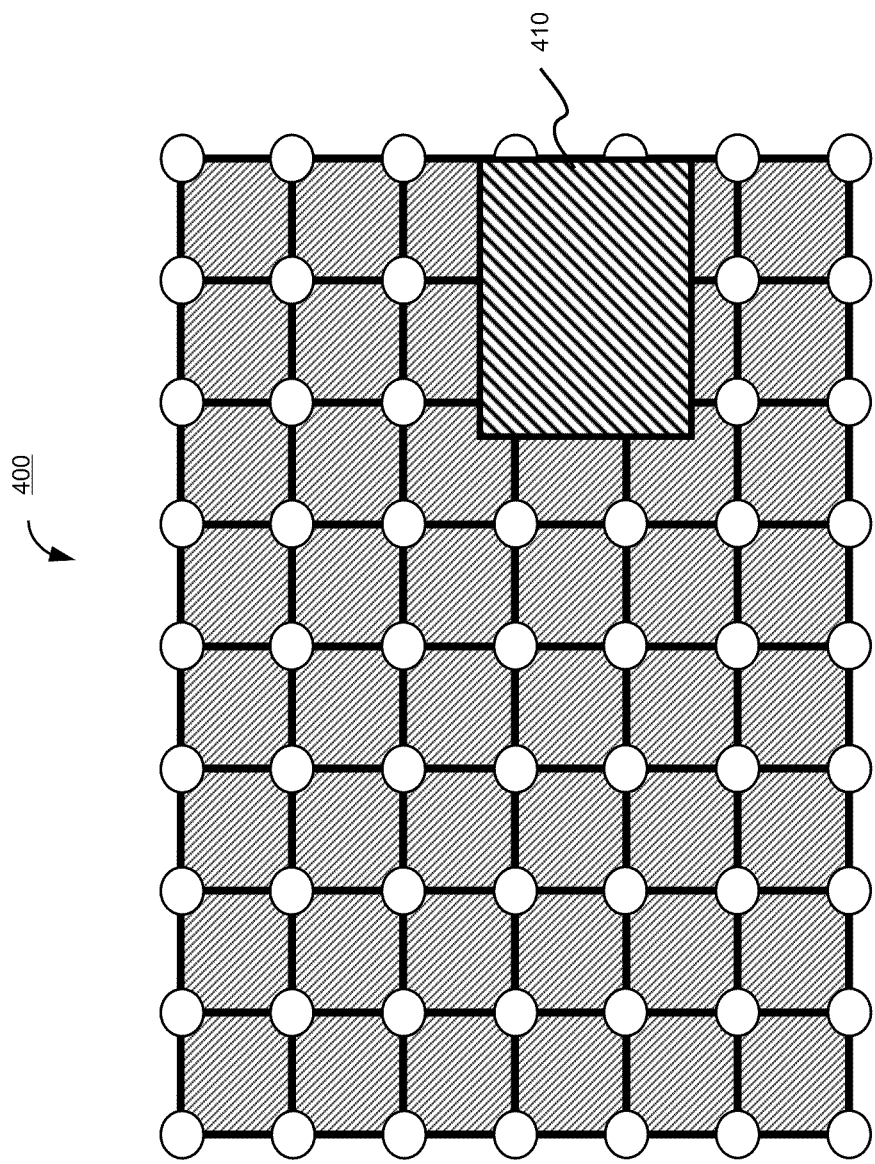
Figure 4C:
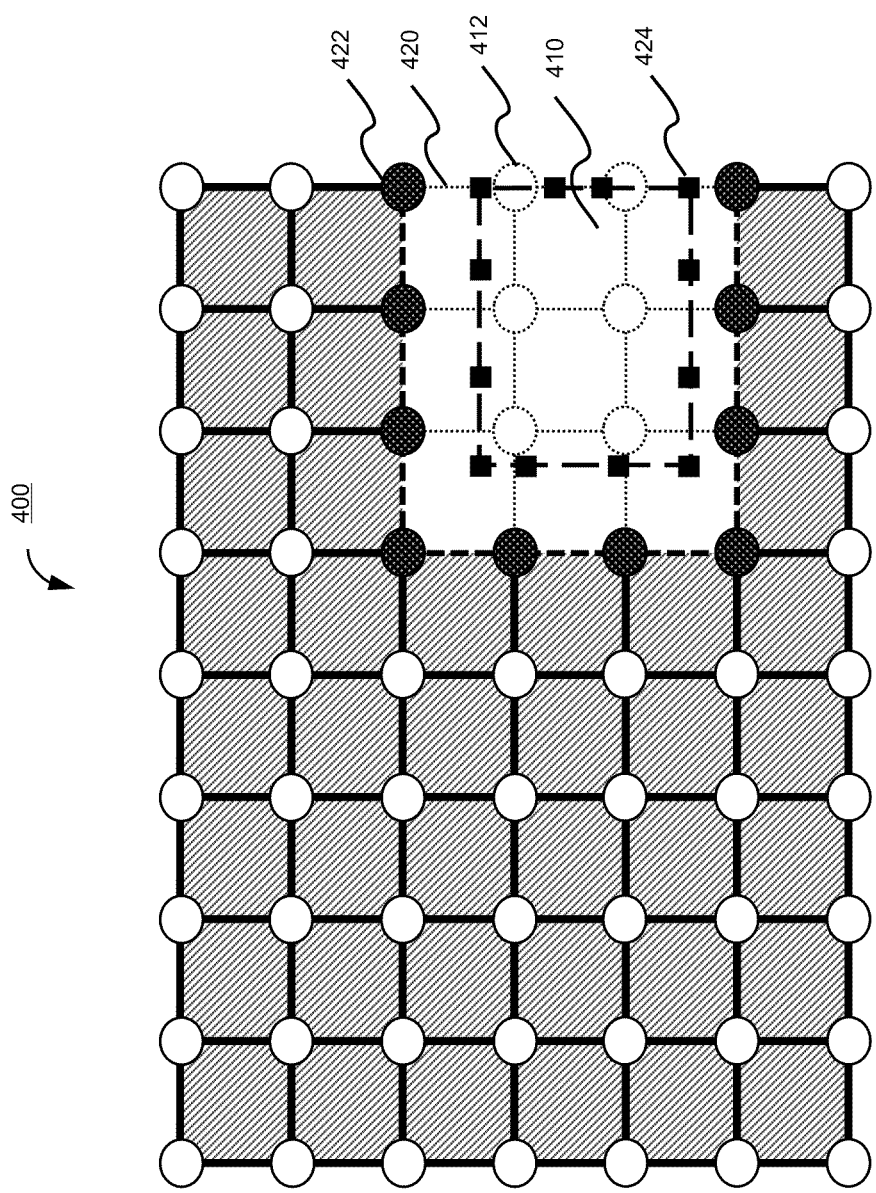

In FIG. 4B, a contact interface area 410 is shown overlapping on top of the mesh 400. The contact interface area 410 can be a portion of the projectile in contact with the rail. FIG. 4C is a diagram showing BEM faces/facets 420 removed from the mesh 400 around the contact area 410. BEM faces on both sides (rail and projectile) 420 are removed. BEM nodes 412 not connecting to any BEM faces are also removed. Nodes 422 in conjunction with corresponding nodes 424 on other side of contact (shown as squares) are used for generating new layer of triangular BEM faces to patch up the hole/gap between the mesh 400 and the contact area 410.

Figure 4D:
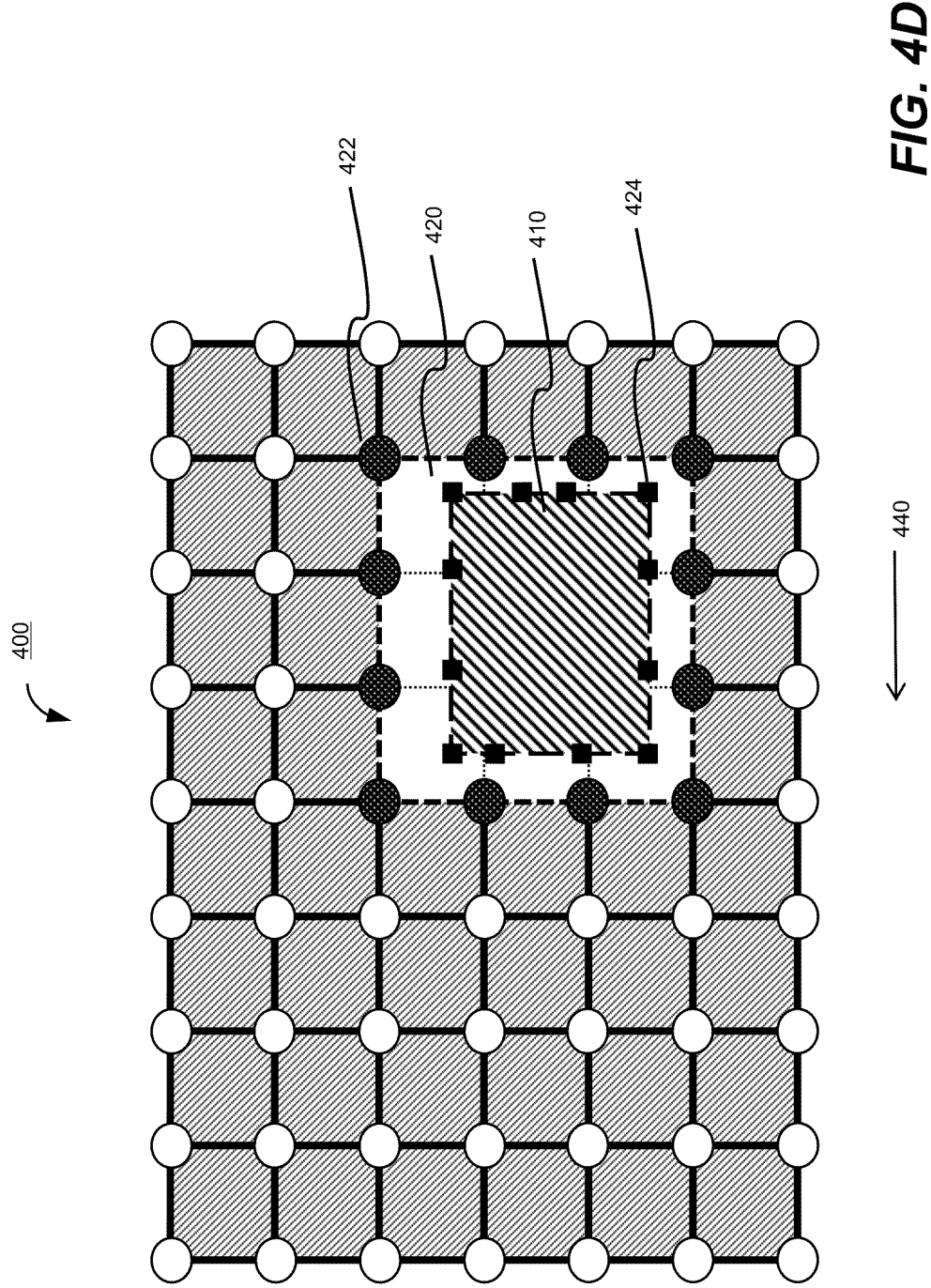

FIG. 4D shows a different configuration which is a later stage from the configuration shown in FIGS. 4B-4C assuming the projectile moves in a direction indicated by arrow 440.

Figure 5A:
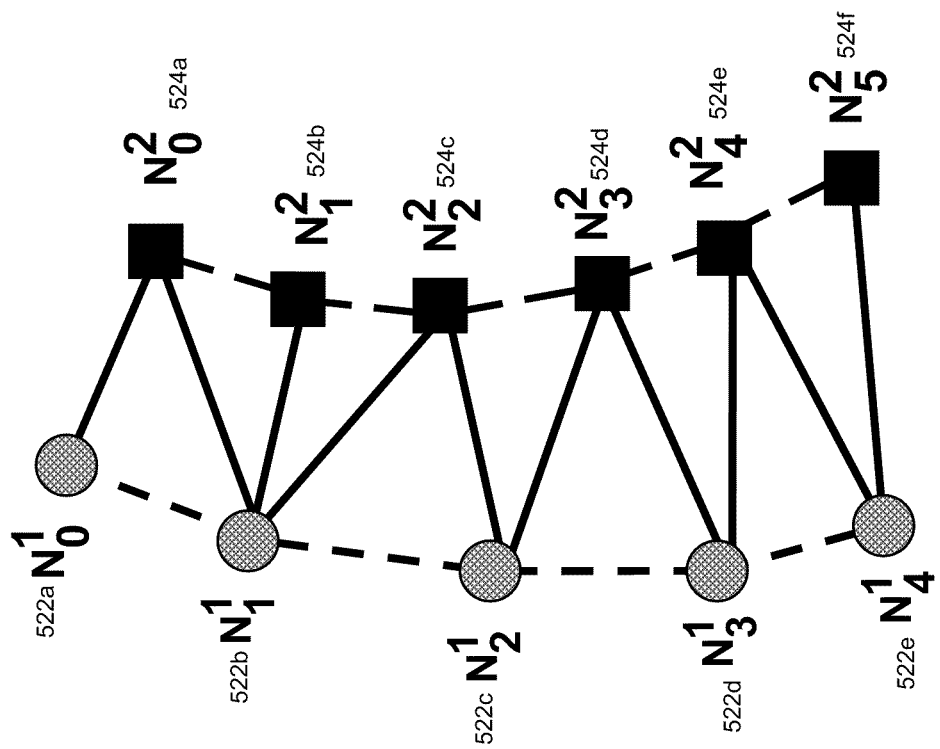
FIGS. 5A-5B are a diagrams showing an exemplary scheme to create BEM faces to patch up the hole/gap along the contact interface's perimeter in a BEM mesh, according to an embodiment of the present invention.

FIG. 5A shows an exemplary scheme of creating new layer of triangular BEM faces using a pair of corresponding node lists along boundary of either side of the hole/gap (e.g., nodes 422 and 424 of FIG. 4D). In FIG. 5A, the first node list 522a-e comprises $N_0^1, N_1^1, N_2^1, N_3^1$, and $N_4^1$, while the second node list 524a-f comprises $N_0^2, N_1^2, N_2^2, N_3^2, N_4^2$, and $N_5^2$. New triangular BEM faces are created using these nodes. In one embodiment, the creation of the BEM faces is based on a scheme depicted in FIG. 5B. For each two pairs of nodes, $N_i^1$, $N_i^2$, $N_{i+1}^1$, and $N_{i+1}^2$, a quadrilateral is formed. Using interior angles $\alpha_1$, $\alpha_2$, $\alpha_3$ and $\alpha_4$, a criterion is defined to determine which diagonal edge ($E_i^1$, or $E_i^2$) to be created.

Figure 6A:
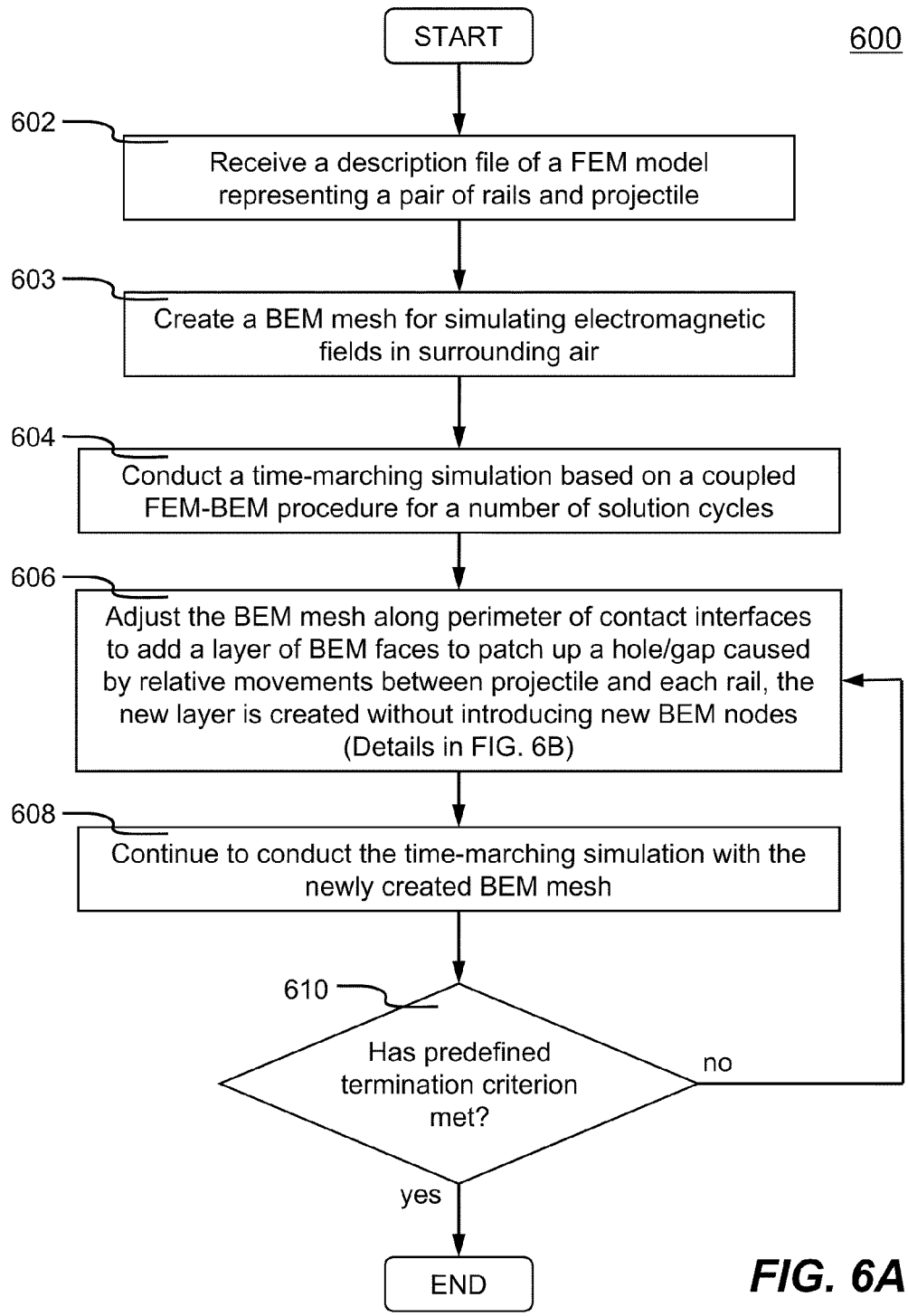
FIGS. 6A-6B are collectively a flowchart showing an exemplary process of numerically simulating physical behavior of an electromagnetic rail-gun that includes a pair of parallel rails and a sliding projectile located therebetween in accordance with one embodiment of the present invention.
Figure 6B:
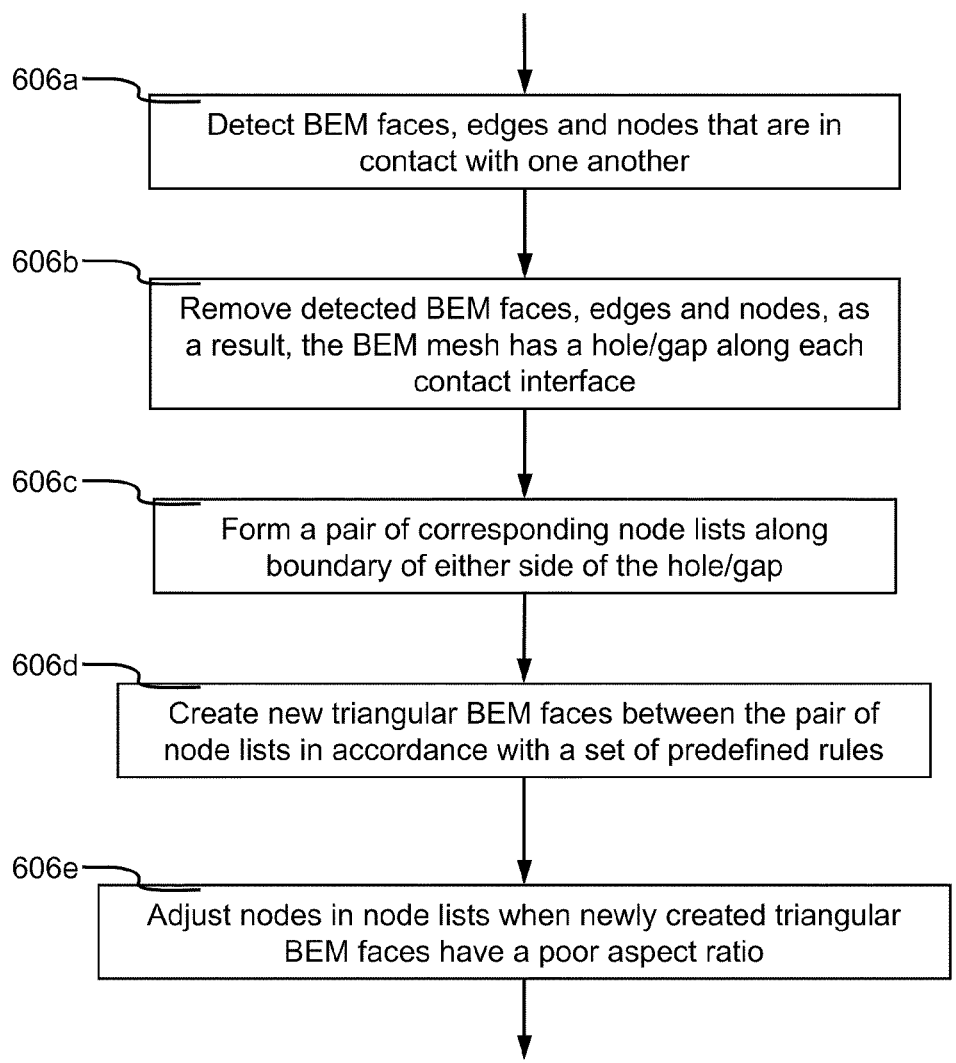

FIGS. 6A-6B are collectively a flowchart showing an exemplary process 600 of numerically simulating physical phenomena of firing an electromagnetic rail-gun in accordance with one embodiment of the present invention. Process 600 is implemented in software.

Process 600 starts with receiving a description file (e.g., input definition) of a finite element method (FEM) model representing an electromagnetic rail-gun, which includes a pair of rails and a projectile at step 602. Next at step 603, a boundary element method (BEM) mesh is created from the FEM model, the outer surface of the FEM model is used as the BEM mesh. The BEM mesh is used for simulating electromagnetic field in the surrounding air of the rail-gun. Then a time-marching simulation based on coupled FEM-BEM procedure is conducted at step 604 for firing of the electromagnetic rail-gun. Time-marching simulation usually comprises a number of solution cycles, each representing a time increment from a previous state.

At each solution cycle, the BEM mesh along the perimeter of moving contact interfaces is adjusted (e.g., removing BEM faces in contact with one another, such that BEM calculations according to the coupled FEM-BEM procedure can be carried out without any numerical problem (e.g., the BEM mesh must not contain any gap or hole, the BEM faces must have an aspect ratio good for numerical computation, etc.). At step 606, a new layer of triangular BEM faces are created for patching up the gap/hole caused by removing the BEM faces in the contact area. Details of step 606 is further shown in FIG. 6B. Next at step 608, the time-marching simulation is carried out with newly created BEM mesh at each solution cycle. Next at decision 610, it is determined whether a predefined termination condition has been met (e.g., predefined end time of the simulation). If 'yes', process 600 ends. Otherwise, process 600 moves back to step 606 for another solution cycle.

Figure 5B:
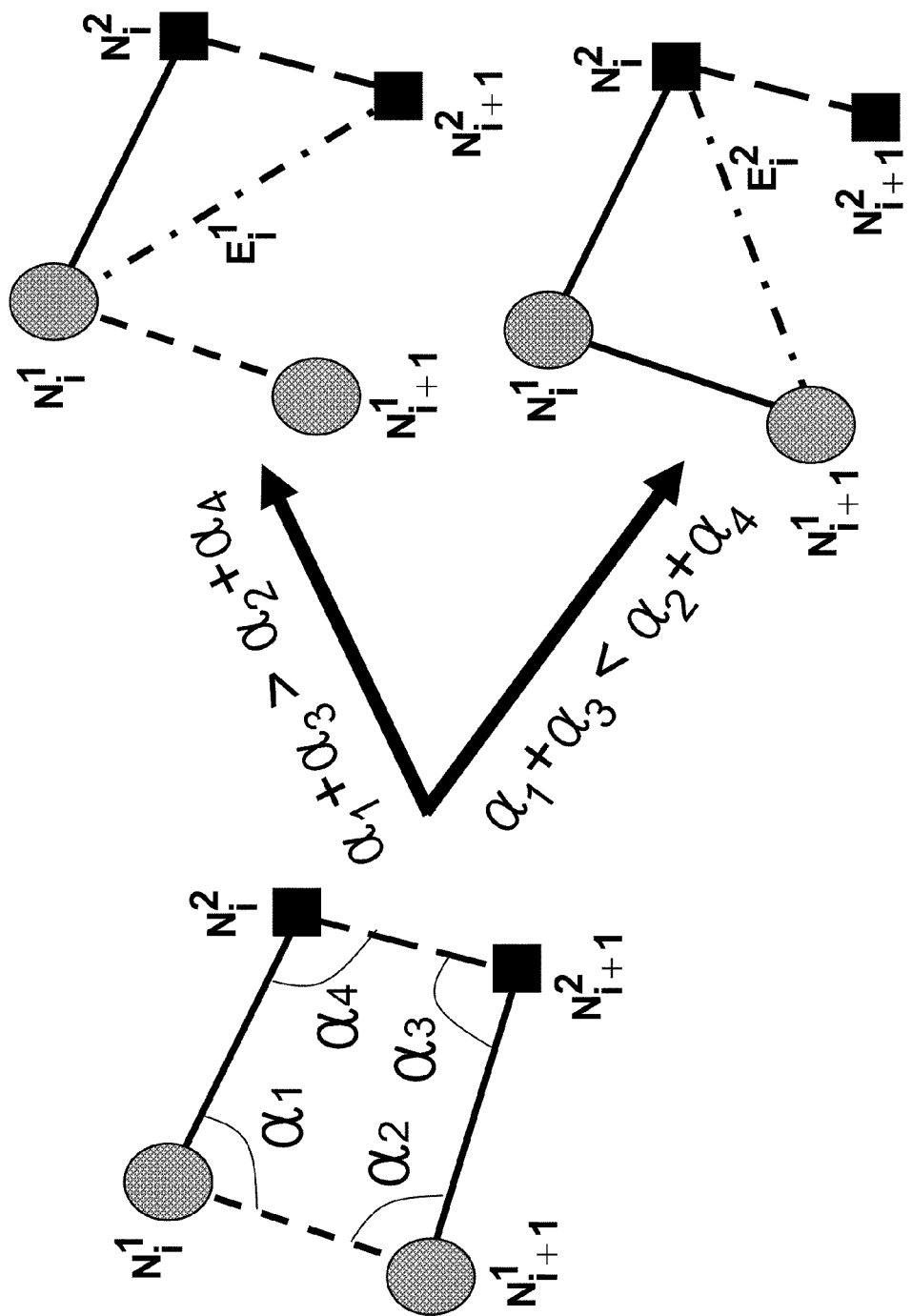

Referring now to FIG. 6B, it is shown details of step 606 of the exemplary process 600 shown in FIG. 6A. At step 606a, process 600 detects BEM faces that are in contact with one another. This can be done with various techniques. In firing the electromagnetic rail-gun, moving contact areas are between the rails and the projectile. Once detected, the BEM faces and associated edges and nodes in the contact area are removed at step 606b. As a result, the BEM mesh has a hole/gap (e.g., gap 420 of FIG. 4C). At step 606c, a pair of corresponding node lists along boundary of either side of the hole/gap is formed. To associate the first pair, closest two nodes are selected according to one embodiment. At step 606d, a new layer of triangular BEM faces are created with adding new BEM nodes to patch up the hole/gap in accordance with a set of predefined rules. For example, a rule to determine the direction of new diagonal edge is shown in FIG. 5B. Finally, at step 606e, nodes in the node lists are adjusted when newly created triangular BEM faces has an aspect ratio not good for numerical calculations (e.g., aspect ratio of 1-to-5). The node adjustment can be performed with various methods, one of which is to move the node in a direction that would make the new triangular BEM mesh having a smaller aspect ratio.

In another embodiment, step 606e is done between steps 606c and 606d, without looking at the aspect ratio. Rather a choice between two edges in FIG. 5B to ensure new triangular BEM faces having a better aspect ratio in terms of numerical BEM procedure.

Figure 7:
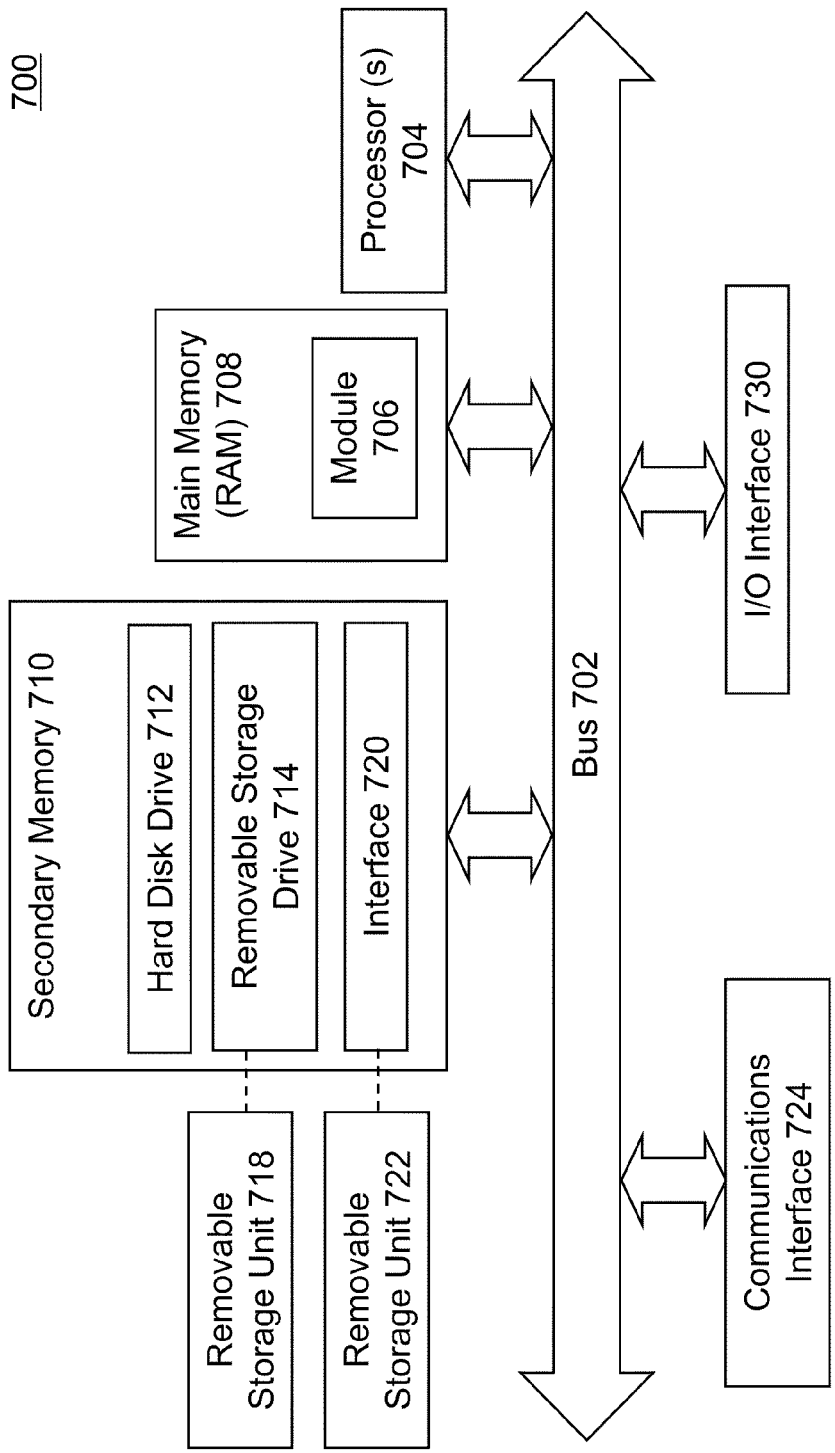
FIG. 7 is a function diagram showing salient components of a computing device, in which an embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium", "computer readable medium", "computer recordable medium" and "computer usable medium" are used to generally refer to media such as removable storage drive 714

(e.g., flash storage drive), and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the CAE analysis (e.g., FEM and BEM results) is reported to the user via the I/O interface 730 either in a text or in a graphical representation, upon user's instruction.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of numerically simulating physical phenomena of an electromagnetic rail-gun comprising:
    receiving, in a computer system, a description file of a finite element method (FEM) model representing the electromagnetic rail-gun that includes a pair of parallel rails and a projectile located there between;
    generating a boundary element method (BEM) mesh by including all outer surfaces of the FEM model to represent ambient air surrounding the rails and the projectile, the BEM mesh comprising a purality of BEM faces with each face corresponds to one of the outer surfaces, wherein the BEM mesh is configured to be a continuous surface without any hole;
    conducting a time-marching simulation of the physical phenomena of the electromagnetic rail-gun using a coupled FEM-BEM procedure with both the FEM model and the BEM mesh, the time-marching simulation includes a plurality of solution cycles;
    at each solution cycle, removing one or more of the BEM faces that are in contact with one another in and around respective contact interfaces between the rails and either side of the projectile; and creating a plurality of new triangular BEM faces in accordance with a set of rules to patch up two holes as a result of the removed BEM faces for ensuring the patched-up BEM mesh is continuous; and
    storing the time-marching simulation's results into a file on a storage device and graphically displaying the results in a monitor upon user's instruction after the time-marching simulation has ended, whereby the storage device and the monitor are coupled to the computer system.

2. The method of claim 1, said creating the new triangular BEM faces further includes forming a pair of corresponding node lists, one list for each of said two holes.

3. The method of claim 2, the set of rules includes not adding new nodes for creating the plurality of new triangular BEM faces.

4. The method of claim 2, the set of rules includes sorting the node lists such that respective first nodes are closest to each other than others in the node lists.

5. The method of claim 2, the set of rules includes adjusting nodes in the node list to ensure better aspect ratio for newly created triangular BEM faces.

6. The method of claim 1, wherein the FEM model is used in solving Maxwell equations to obtain electric field, magnetic field, induced currents, electromagnetic (Lorentz) forces and ohmic heating in the rails and the projectile.

7. The method of claim 1, wherein the FEM model is used for solving mechanical fields and thermal fields in the rails and the projectile.

8. The method of claim 1, wherein the BEM mesh is used in solving electromagnetic fields in surrounding air.

9. A non-transitory computer readable medium containing instructions for controlling a computer system for performance of numerically simulating physical phenomena of an electromagnetic rail-gun by a method comprising:
    receiving, in a computer system, a description file of a finite element method (FEM) model representing the electromagnetic rail-gun that includes a pair of parallel rail and a projectile located there between;
    generating a boundary element method (BEM) mesh by including all outer surfaces of the FEM model to represent ambient air surrounding the rails and the projectile, the BEM mesh comprising a plurality of BEM faces with each face corresponds to one of the outer surfaces, wherein the BEM mesh is configured to be a continuous surface without any hole;
    conducting a time-marching simulation of the physical phenomena of the electromagnetic rail-gun using a coupled FEM-BEM procedure with both the FEM model and the BEM mesh, the time-marching simulation includes a plurality of solution cycles;
    at each solution cycle, removing one or more of the BEM faces that are in contact with one another in and around respective contact interfaces between the rails and either side of the projectile; and creating a plurality of new triangular BEM faces in accordance with a set of rules to patch up two holes as a result of the removed BEM faces for ensuring the patched-up BEM mesh is continuous; and
    storing the time-marching simulation's results into a file on a storage device and graphically displaying the results in a monitor upon user's instruction after the time-marching simulation has ended, whereby the storage device and the monitor are coupled to the computer system.

10. A system for numerically simulating physical phenomena of an electromagnetic rail-gun comprising:

a main memory for storing computer readable code for at least one application module;

at least one processor coupled to the main memory, said at least one processor executing the computer readable code in the main memory to cause the at least one application module to perform operations by a method of:

receiving a description file of a finite element method (FEM) model representing the electromagnetic rail-gun that includes a pair of parallel rails and a projectile located there between;

generating a boundary element method (BEM) mesh by including all outer surfaces of the FEM model to represent ambient air surrounding the rails and the projectile, the BEM mesh comprising a plurality of BEM faces with each face corresponds to one of the outer surfaces, wherein the BEM mesh is configured to be a continuous surface without any hole;

conducting a time-marching of the physical phenomena of the electromagnetic rail-gun simulation using a coupled FEM-BEM procedure with both the FEM model and the BEM mesh, the time-marching simulation includes a plurality of solution cycles;

at each solution cycle, removing one or more of the BEM faces that are in contact with one another in and around respective contact interfaces between the rails and either side of the projectile; and creating a plurality of new triangular BEM faces in accordance with a set of rules to patch up two holes for ensuring the patched-up BEM mesh is continuous; and storing the time-marching simulation's results into a file on a storage device and graphically displaying the results in a monitor upon user's instruction after the time-marching simulation has ended.

* * * * *